United States Patent
Khmelev et al.

(10) Patent No.: US 11,922,352 B1
(45) Date of Patent: Mar. 5, 2024

(54) SYSTEM AND METHOD FOR RISK TRACKING

(71) Applicant: United Services Automobile Association (USAA), San Antonio, TX (US)

(72) Inventors: Yevgeniy Viatcheslavovich Khmelev, San Antonio, TX (US); Susan Elizabeth Wright, San Antonio, TX (US); David M. Jones, Jr., San Antonio, TX (US); Michael Anthony Miller, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/203,289

(22) Filed: Mar. 16, 2021

Related U.S. Application Data

(60) Provisional application No. 63/001,940, filed on Mar. 30, 2020.

(51) Int. Cl.
| | |
|---|---|
| *G06Q 10/0635* | (2023.01) |
| *G06F 16/248* | (2019.01) |
| *G06F 16/28* | (2019.01) |
| *G06N 20/00* | (2019.01) |

(52) U.S. Cl.
CPC ....... *G06Q 10/0635* (2013.01); *G06F 16/248* (2019.01); *G06F 16/28* (2019.01); *G06N 20/00* (2019.01)

(58) Field of Classification Search
CPC .... G06Q 10/0635; G06Q 50/18; G06N 20/00; G06F 16/28; G06F 16/248; G06F 40/143
See application file for complete search history.

(56) References Cited

U.S. PATENT DOCUMENTS

| | | | |
|---|---|---|---|
| 2018/0365201 A1* | 12/2018 | Hunn | G06F 40/134 |
| 2019/0394238 A1* | 12/2019 | Putz | H04L 63/20 |
| 2020/0273046 A1* | 8/2020 | Biswas | G06N 3/08 |
| 2020/0293608 A1* | 9/2020 | Nelson | G06F 40/169 |

\* cited by examiner

*Primary Examiner* — Mehmet Yesildag
*Assistant Examiner* — Ayanna Minor
(74) *Attorney, Agent, or Firm* — Fletcher Yoder, P.C.

(57) ABSTRACT

Disclosed are systems and methods for facilitating identification of risk across risk silos in an organization. Machine learning utilizes risk identification data from two or more silos to identify risk associated with electronic change requests provided to the system. Regulatory/compliance results are submitted to a blockchain for immutable recordation of compliance status.

20 Claims, 4 Drawing Sheets

SYSTEM AND METHOD FOR RISK TRACKING

RELATED CASES

The present disclosure is related to, and claims priority to, U.S. Provisional Patent Application Ser. No. 63/001,940, titled "SYSTEM AND METHOD FOR RISK TRACKING," which was filed on Mar. 30, 2020, and which is herein incorporated by reference in its entirety for all purposes.

BACKGROUND

The present disclosure relates generally to systems and methods for facilitating tracking related to risk an electronic world. In particular, the present disclosure relates to systems and methods for facilitating/improving online risk assessment.

Risk assessment is a significant issue for many companies. As technological systems evolve, changes may impact the company. For example, these change may invoke strategic risk, compliance/regulatory risk, operational risks, financial/economic risk, reputation/band risk, and/or legal risks.

Unfortunately, the current technological platforms used to track risk are lacking. Oftentimes, changes occur in a siloed manner, causing inadvertent risk to be introduced to the company. Accordingly, there is a need to improve and/or supplement the existing risk tracking platforms, ensuring adequate provision of information vital to efficient sharing of risk information throughout a company.

SUMMARY

Implementations of the present disclosure are generally directed to systems and methods for tracking and communicating risk throughout a company.

It is appreciated that methods in accordance with the present disclosure may include any combination of the aspects and features described herein. That is, methods in accordance with the present disclosure are not limited to the specific combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an exemplary embodiment," or "an embodiment" of the present disclosure are not intended to be interpreted as excluding the existence of additional embodiments that also incorporate the recited features.

As may be appreciated, implementations of the present disclosure may be embodied as a system, method, device, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer-readable program code embodied thereon.

Figure 1:
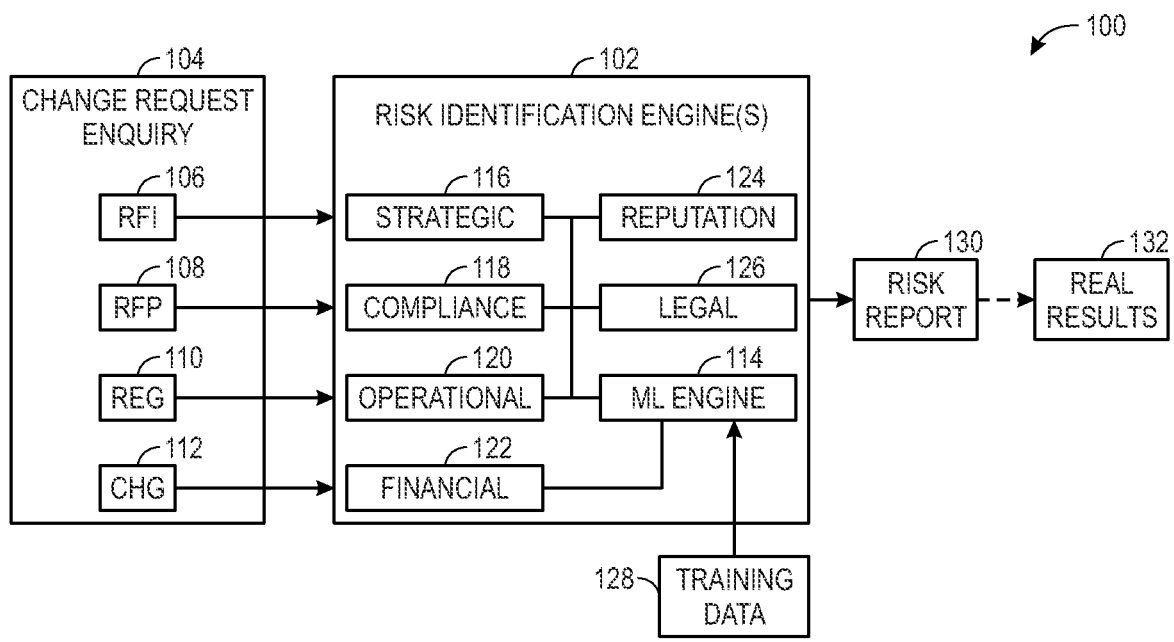
FIG. 1 is a schematic diagram of a system that communicates risk across company silos, according to implementations of the present disclosure.

FIG. 1 is a schematic diagram of a system 100 that communicates risk across company silos, according to implementations of the present disclosure. The system includes one or more risk identification engines 102. The risk identification engines 102 identify risks associated with change requests/inquiries 104. For example, a change request/inquiry 104 may include an electronic indication of particular potential changes in an organization and a request for risk identification associated with such changes. As illustrated, in some embodiments, the change request/inquiries 104 may be submitted as an electronic document in a specified template format. For example, the electronic document could be a templated request for information (RFI) 106, an electronic request for proposal (RFP) 108, an electronic regulation (REG) 110, and/or other indication of potential change (CHG) 112.

The change request/inquiry 104 may have varying granularities of information. Less-granular change request/inquires 104 may trigger more risk identifications, while more-granular change request/inquires 104 may provide more precise risks.

The RFI 106 may be an electronic indication of a potential change to a system, where there may not be sufficient information to write a detailed description of the implementation of a change. This indication likely occurs when more information will be provided from vendors associated with the change. Thus, this type of change request/inquiry 104 may be a relatively low granularity change request/inquiry 104 compared to other types of change request/inquiry 104.

The RFP 108 may be somewhat more detailed than the RFI 106. In particular, procurement rule details may be provided, while implementation details may still not be known. Thus, some specification details may be unknown. Therefore, a wider net of risk may be identified, based upon identified deviations in specification details.

The REG 110 may include an electronic indication of regulations that may be possibly implemented. As may be appreciated, regulations may be quite specific. Thus, the REG 110 may provide relatively more precise risk assessments for a narrower net of risk.

Upon receiving the change request/inquiry 14, the risk identification engines 102 may use one or more machine learning engines 114 to identify different types of risk. For example, in some embodiments, strategic risk 116, compliance risk 118, operational risk 120, financial risk 122, reputation risk 124, and/or legal risk 126 may be identified by machine learning engines 114.

Strategic risk 116 may refer to risk that failed business decisions, or lack thereof, may pose to a company. Strategic risk is often a major factor in determining a company's worth, particularly observable if the company experiences a sharp decline in a short period of time.

Compliance risk 118 may refer to exposure to legal penalties, financial forfeiture and material loss an organization faces when it fails to act in accordance with industry laws and regulations, internal policies or prescribed best practices.

Operational risk 120 may refer to the prospect of loss resulting from inadequate or failed procedures, systems or policies, employee errors, systems failures, fraud and/or other criminal activity.

Financial risk 122 may refer to risk that a company won't be able to meet its obligations to pay back its debts. This, in turn, could mean that potential investors will lose the money invested in the company. The more debt a company has, the higher the potential financial risk.

Reputational risk 124 may refer to threat or danger to the good name or standing of a business or entity and can occur through a variety of ways. As may be appreciated, this type of risk may have monetary implications for an organization.

Legal risk 126 may refer to risk of financial or reputational loss that can result from lack of awareness or misunderstanding of, ambiguity in, or reckless indifference to, the way law and regulation apply to your business, its relationships, processes, products and services.

The machine learning engines 114 may use the accumulated data from the change request/inquiry 104 to identify risk. Depending on the inferences to be made, the machine learning circuitry may implement different forms of machine learning. For example, in some embodiments (e.g., when particular known examples exist that correlate to future predictions that machine learning circuitry will be tasked with generating) supervised machine learning may be implemented. In supervised machine learning, the mathematical model of a set of data contains both the inputs and the desired outputs. This data is referred to as training data 128 and is essentially a set of training examples. Each training example has one or more inputs and the desired output, also known as a supervisory signal. In the mathematical model, each training example is represented by an array or vector, sometimes called a feature vector, and the training data is represented by a matrix. Through iterative optimization of an objective function, supervised learning algorithms learn a function that can be used to predict the output associated with new inputs. An optimal function will allow the algorithm to correctly determine the output for inputs that were not a part of the training data. An algorithm that improves the accuracy of its outputs or predictions over time is said to have learned to perform that task.

Supervised learning algorithms include classification and regression. Classification algorithms are used when the outputs are restricted to a limited set of values, and regression algorithms are used when the outputs may have any numerical value within a range. Similarity learning is an area of supervised machine learning closely related to regression and classification, but the goal is to learn from examples using a similarity function that measures how similar or related two objects are. It has applications in ranking, recommendation systems, visual identity tracking, face verification, and speaker verification.

Additionally and/or alternatively, in some situations, it may be beneficial for the machine-learning circuitry to utilize unsupervised learning (e.g., when particular output types are not known). Unsupervised learning algorithms take a set of data that contains only inputs, and find structure in the data, like grouping or clustering of data points. The algorithms, therefore, learn from test data that has not been labeled, classified or categorized. Instead of responding to feedback, unsupervised learning algorithms identify commonalities in the data and react based on the presence or absence of such commonalities in each new piece of data.

Cluster analysis is the assignment of a set of observations into subsets (called clusters) so that observations within the same cluster are similar according to one or more predesignated criteria, while observations drawn from different clusters are dissimilar. Different clustering techniques make different assumptions on the structure of the data, often defined by some similarity metric and evaluated, for example, by internal compactness, or the similarity between members of the same cluster, and separation, the difference between clusters. Other methods are based on estimated density and graph connectivity.

Risk predictions may be derived by the machine learning circuitry. For example, risk associated with particular specifics of the change request/inquiry 104 provided may be predicted and numerated by a risk score. The risk scores may be weighted based upon likelihood of occurrence, identification, and consequences. The risk score may be provided via a risk report 130, enabling quick and easy understanding of risk that may be associated with the change request/inquiry 104. As detailed herein, particular graphical user interface (GUI) features may be rendered based upon the risk score, particular application features/functions may be enabled based upon the risk score, etc. This may greatly enhance user experience when trying to identify risk.

Once actual results regarding the change request/inquiry 104 are realized, the real results 132 may be fed back into the risk identification engines 102 as new training data 128. In this manner, the risk identification engines 102 may continue to learn from changes as they are actually implemented. This may help improve the accuracy and/or precision of the identified risks associated with subsequent change request/inquiries 104 that are presented to the risk identification engines 102.

Figure 2:
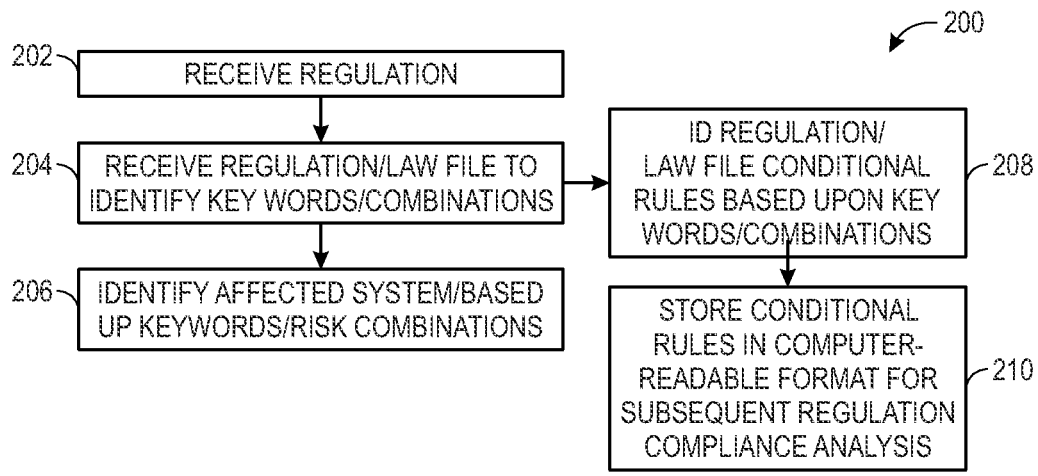
FIG. 2 is a flow diagram illustrating a process for identifying compliance risk and storing compliance rules, according to implementations of the present disclosure.

As mentioned above, compliance risk is exposure to legal penalties, financial forfeiture and material loss an organization faces when it fails to act in accordance with industry laws and regulations, internal policies or prescribed best practices. FIG. 2 is a flow diagram illustrating a process 200 for identifying compliance risk and storing compliance rules, according to implementations of the present disclosure.

The process 200 begins with receiving a regulation/law file (block 202). The regulation/law file may be a specialized computer parsable file (e.g., via a tag structure) that indicates conditions and corresponding actions/computations. For example, the regulation law file may include an extensible markup language (XML) file with tags that define conditions and their corresponding actions/computations.

Next, the regulation/law file is parsed to identify key words/combinations that may apply to an organization (block 204). For example, the machine learning engines 114 may identify from the tags, particular words/phrases that are in the regulation/law file that are in identified machine learning patterns that indicate risk.

Next, the machine learning engines 114 may identify affected systems and/or risk based upon the identified keywords/phrases (block 206). As previously discussed, the risk to particular systems may be identified based upon patterns identified by the machine learning engines 114. The identified risk may be presented via a risk report, such as an electronic graphical rendering indicating the identified risk. In some embodiments, the risk report may include a risk score, particular departments and/or systems potentially affected, particular risk contacts to reach out to for advisement, etc.

In some embodiments, potential mitigation tasks based upon prior actual results may be provided. For example, identified risk could be further processed to identify a subset of mitigation actions stored in a mitigation action library. In some embodiments, costs could be associated with these mitigation actions, such that mitigation costs can be compared against financial risks, such that mitigation tasks that are within or over a threshold of the financial risks are not suggested as a potential mitigation task.

In parallel, a subset of the conditional rules that apply to the organization and/or situations being analyzed may be identified based upon the key words/phrases (block 208). This subset of conditional rules may be stored in a computer-readable format for subsequent regulation compliance analysis (block 210).

Figure 3:
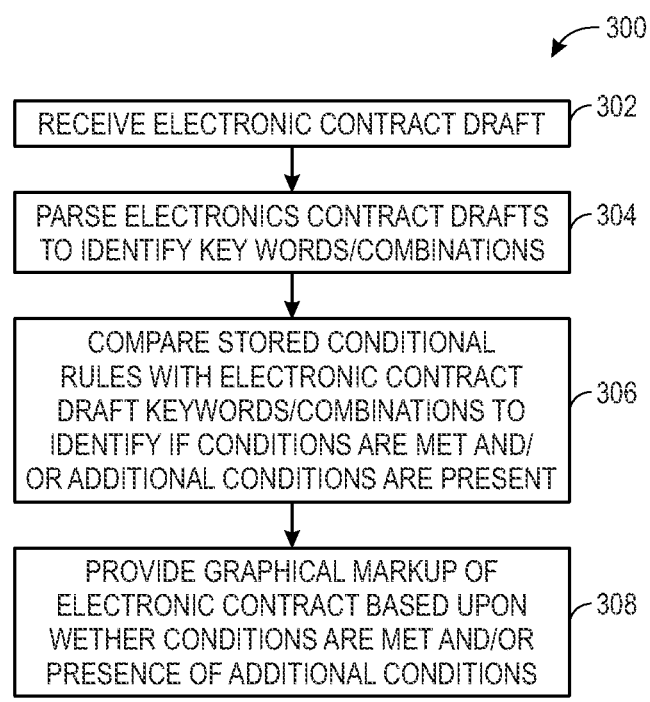
FIG. 3 is a flow diagram illustrating a process for determining compliance risk associated with an electronic document, according to implementations of the present disclosure.

For example, FIG. 3 is a flow diagram illustrating a process 300 for determining compliance risk associated with an electronic document, according to implementations of the present disclosure.

The process 300 begins with receiving an electronic contract draft (block 302). The electronic contract draft may include a computer parsable file, enabling the electronic contract draft to be parsed to identify keywords/phrases that may pertain to stored conditional rules (e.g., from block 210 of FIG. 2) (block 304).

The stored conditional rules are compared with the electronic contract draft keywords/phrases to identify if conditions are met and/or if additional conditions (e.g., that may apply to other risks known by the risk identification engine 114) are present (block 306). Based upon this comparison, actions that should be in the contract can be identified. A determination can be made as to whether these actions are in the contract.

Figure 4:
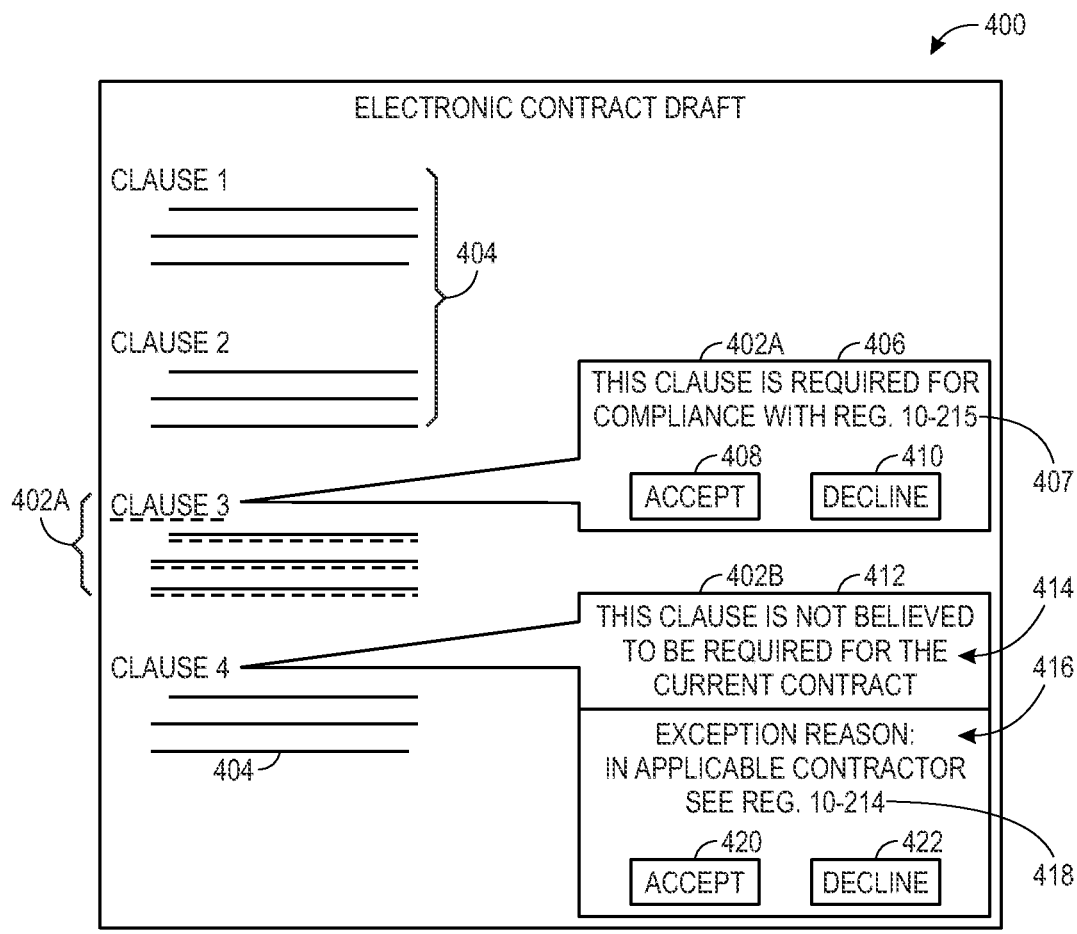
FIG. 4 is a schematic diagram of a graphical user interface that provides an electronic document markup based upon identified compliance risk, according to implementations of the present disclosure.

Markups to the contract can be determined based upon whether actions corresponding to the conditions are in the contract and/or whether other additional conditions were found. A graphical markup of the electronic contract can be provided (block 308). For example, FIG. 4 illustrates an example graphical user interface (GUI) 400 where markups 402A and 402B are added to original text 404 of an electronic contract draft. The markups 402A include an added clause (e.g., as indicated by dashed underlines under clause 3). Further, the markups 402A include a comment balloon 406 that indicates why clause 3 was added (e.g., for compliance with regulation 10-215). Further, a link 407 may be provided, that when selected, renders a graphical illustration of the referred to regulation.

The user is provided an affordance 408 to selectively accept the change and an affordance 410 to selectively decline the change. In other words, when affordance 408 is selected, the comment balloon 406 may disappear and clause 3 may be added as original text of the contract (e.g., the dashed underlines may disappear). Alternatively, when affordance 410 is selected, both the comment balloon 406 and clause 3 may disappear. In some embodiments, when the affordance 410 is selected, declining addition of an identified clause, a requirement to input a reason for declining the addition of the additional clause may be solicited. This input may be stored at a risk management data store, such that a historical representation of the contract may be maintained.

The markup 402B includes a comment balloon 412, corresponding to a clause in the contract (e.g., here clause 4). The comment balloon 412 indicates that clause 4 is not believed to be needed for the current contract, as indicated in comment section 414. Sub-comment section 416 may provide a particular reason. In the current example, the sub-comment section 416 indicates that clause 4 does not appear to be applicable to the contractor with which the contract applies. A link 418 to a regulation regarding the contractor and/or clause 4 may be provided. When selected, the link 418 results in a graphical rendering of the referred to regulation. The user is provided an affordance 420 to selectively accept a change (e.g., removal of the clause 4) and an affordance 410 to selectively decline the change.

Figure 5:
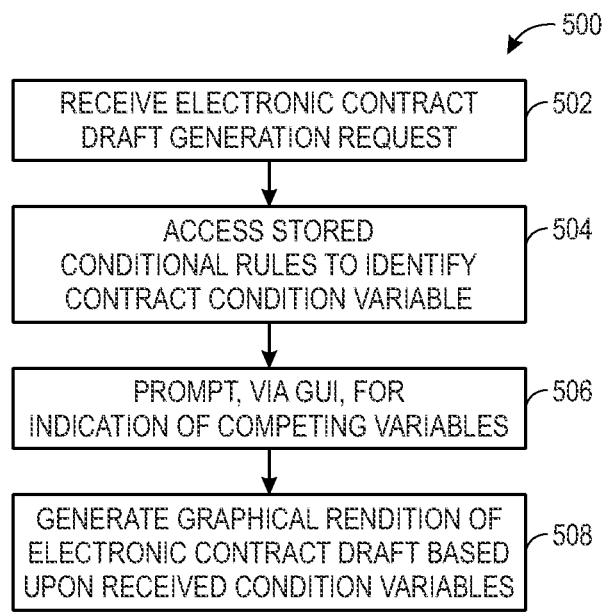
FIG. 5 is a flow diagram illustrating a process for generating an electronic document that conforms to compliance rules, according to implementations of the present disclosure.

In some embodiments, contracts can be automatically generated based upon regulations. FIG. 5 is a flow diagram illustrating a process 500 for generating an electronic document that conforms to compliance rules, according to implementations of the present disclosure.

Process 500 begins with receiving an electronic contract draft generation request (block 502). For example, the request may be triggered via a user input into a graphical user interface (GUI).

Next, stored conditional rules are accessed to identify contract condition variables (block 504). For example, certain clauses may need to be in a contract when certain contract condition variables exist.

Next a prompt may be provided, via the GUI, polling for an indication of variable values (block 506). For example, variables might include information regarding parties to the contract, objects associated with the contract, etc.

Clauses to be inserted into the electronic contract may be identified from a library of clauses, based upon the variable values. These clauses may be aggregated into a contract and a graphical rendition of the electronic contract draft may be generated based upon the variable values (block 508).

Figure 6:
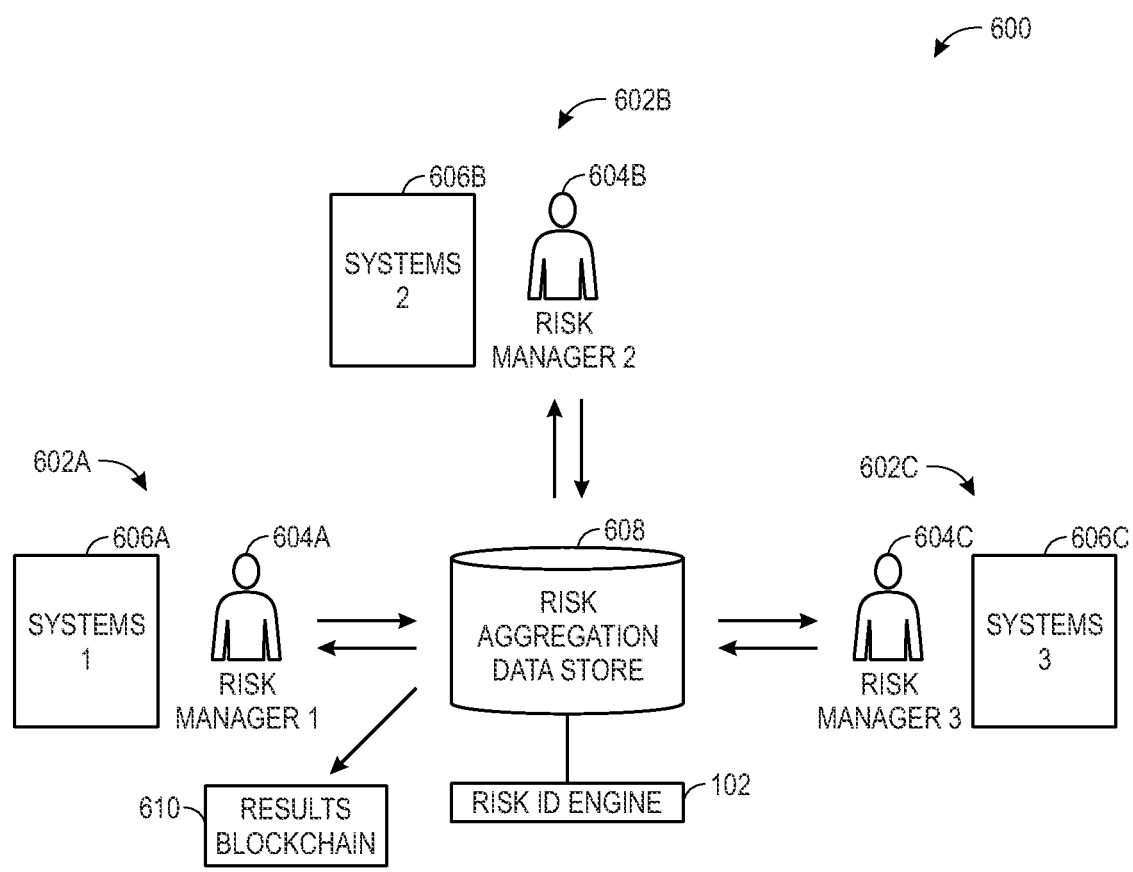
FIG. 6 is a schematic diagram illustrating a risk aggregation data store system for cross-identifying and reporting of risk across silos in an organization, according to implementations of the present disclosure.

As mentioned above, the current systems may solve siloed risk analysis. For example, FIG. 6 is a schematic diagram illustrating a risk aggregation data store system 600 for cross-identifying and reporting of risk across silos in an organization, according to implementations of the present disclosure. In the current embodiment, multiple risk silos 602A, 602B, and 602C exist within an organization. In other words, a risk manager 604A that is aware of systems 606A may not be aware of systems 606B and/or 606C or the risks associated with these systems 606B and/or 606C. Further, risk manager 604B may not be aware of systems 606A and 606C or the risks associated with those systems 606A and 606C. Risk manager 604C may not be aware of systems 606A and 606B or the risks associated with those systems 606A and 606B.

To counteract the siloing of risk awareness of these systems 606A, 606B, and 606C, the risk identification engines 102 may be charged with receiving and accumulating risk information from each of the risk managers 604A, 604B, and 604C. The risk information may be stored in the risk aggregation data store 608. The data in the risk aggregation data store 608 may be used as training data 128, as described in FIG. 1. This may enable risk awareness across risk silos 602A, 602B, and 602C.

In this manner, inputs from separate sources may be analyzed to identify overlapping and conflicting interests within an organization. For example, if risk silo 602A is inquiring about issues similar to inquiries already submitted by risk silo 602B, a correlation may be made by the risk identification engine 102, enabling more efficient cached processing by combining communication to both risk silos 602A and 602B and/or caching risk identification results from one risk silo to another.

In some embodiments, risk identification and/or regulatory compliance results may be outputted by the risk identification engine 102 to be inserted on a results blockchain 610. As may be appreciated, a blockchain is a specialized computer data structure that is resistant to modification of inserted data. The blockchain 610 enables a growing list of compliance/risk records (e.g., "blocks") that are linked to one another using cryptography. Each block contains a cryptographic hash of the previous block, along with a timestamp and transaction data.

The blockchain 610 may, in some embodiments, be managed by a peer-to-peer network collectively adhering to a protocol for inter-node communication and validating new blocks. Once recorded, the data in any given block cannot be altered retroactively without alteration of all subsequent blocks, which requires consensus of the network majority. Thus, modifications to blocks in the blockchain 610 may be particularly difficult. This may provide a clear benefit to regulatory transaction recordkeeping. Indeed, regulatory compliance records placed on the blockchain become hardened, difficult to alter. Thus, regulatory compliance officers can rest assured that blockchain 610 data has likely not been manipulated, ensuring that compliance status on the blockchain 610 is unaltered from a prior state.

Technical effects of the present disclosure include supplementing a vehicle lending services platform 104 with additional functionality to facilitate a shared economy of vehicle lending. In particular, data aggregation may be used to obtain and aggregate relevant data from a multitude of electronic services. Machine learning may be implemented on the aggregated data to identify patterns associated with various levels of risk associated with a potential lend of a vehicle. The results of the risk analysis may be quantified and presented, either by the lender support services or the vehicle lending services platform, as described herein.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A tangible, non-transitory, computer-readable medium, comprising computer-readable instructions that, when executed by one or more processors of a computer, cause the computer to:
   receive first risk identification information from a first risk silo associated with a first subsystem of a system;
   receive second risk identification information from a second risk silo associated with a second subsystem of the system;
   store the first risk identification information and the second risk identification information in a risk aggregation data store;
   receive a change request indicating a potential change to the system, wherein the change request comprises a specialized computer parsable file comprising a tag structure, wherein the computer parsable file comprises tags that define conditions and corresponding computations associated with the system in response to the potential change;
identify key words, phrases, or both from the change request by performing machine learning based upon the tags using a machine learning algorithm comprising a mathematical model configured to learn an objective function, wherein the mathematical model comprises input data and output data, wherein the objective function is configured to enable the machine learning algorithm to determine the output data for the input data that is not a part of training data used to train the mathematical model;
identify machine learning patterns indicating the potential change by performing the machine learning based upon the key words, phrases, or both;
identify a risk associated with the change request, by performing the machine learning based upon the machine learning patterns, using the first risk identification information and the second risk identification information as the training data;
present the risk via an electronic risk report;
add the risk to the risk aggregation data store configured to update the training data based on the risk;
iteratively optimize the objective function based on the updated training data;
retrain the mathematical model to learn the iteratively optimized objective function based on the updated training data;
enable the first risk silo and the second risk silo to cross-identify and report one or more new risks across the first subsystem and the second subsystem with improved accuracy based on the first risk identification information and the second risk identification information using the machine learning comprising the iteratively optimized objective function and retrained mathematical model;
receive an electronic document from the system;
generate recommendations based on a risk compliance analysis using the machine learning based on the key words, phrases, or both, and the electronic document; and
generate a graphical markup of the electronic document based on the recommendations, wherein the electronic markup comprises an interactive graphic user interface configured to allow a user to modify the electronic document based on the recommendations.

2. The computer-readable medium of claim 1, comprising computer-readable instructions, that when executed by the one or more processors of the computer, cause the computer to: retrieve an electronic indication of real results associated with an implementation of the change request; and apply the real results to the training data to impact subsequent machine learning.

3. The computer-readable medium of claim 1, comprising computer-readable instructions, that when executed by the one or more processors of the computer, cause the computer to: receive change requests of varying granularity, wherein relatively granular change requests result in more precise risk results with a narrower risk net.

4. The computer-readable medium of claim 1, wherein the change request comprises an electronic request for information (RFI) and/or an electronic request for proposal (RFP).

5. The computer-readable medium of claim 1, wherein the change request comprises an electronic regulation (REG), comprising an indication of conditions and corresponding actions.

6. The computer-readable medium of claim 5, comprising computer-readable instructions, that when executed by the one or more processors of the computer, cause the computer to: parse the electronic regulation to identify regulation key words, phrases, or both; and perform the machine learning based upon a comparison of the key words, phrases, or both from the change request and the regulation key words, phrases, or both.

7. The computer-readable medium of claim 5, comprising computer-readable instructions, that when executed by the one or more processors of the computer, cause the computer to: parse the electronic regulation to identify regulation key words, phrases, or both; and identify conditions associated with the regulation keywords, phrases, or both; store the conditions associated with the regulation key words, phrases, or both in a data store for subsequent regulation compliance analysis.

8. The computer-readable medium of claim 7, comprising computer-readable instructions, that when executed by the one or more processors of the computer, cause the computer to: perform the subsequent regulation compliance analysis, by: receiving an electronic contract draft from the electronic document; parsing the electronic contract draft to identify draft key words, phrases, or both; comparing the stored conditions with the regulation key words, phrases, or both to the draft key words, phrases, or both to identify whether the conditions are met; and provide the graphical markup of the electronic contract draft based at least in part upon whether the conditions are met.

9. The computer-readable medium of claim 8, wherein the graphical markup comprises a comment balloon.

10. The computer-readable medium of claim 9, comprising computer-readable instructions, that when executed by the one or more processors of the computer, cause the computer to: render a markup indicating that a portion of the electronic contract draft is believed to not apply to a current situation applicable to the electronic contract draft.

11. The computer-readable medium of claim 9, comprising computer-readable instructions, that when executed by the one or more processors of the computer, cause the computer to: render a markup providing a new portion to the electronic contract draft and indicating that the new portion of the electronic contract draft is believed to apply to a current situation applicable to the electronic contract draft.

12. The computer-readable medium of claim 1, comprising computer-readable instructions, that when executed by the one or more processors of the computer, cause the computer to: present the electronic risk report to a results blockchain, wherein the electronic risk report comprises a block submitted for placement on the results blockchain.

13. A computer-implemented method, comprising:
receiving first risk identification information from a first risk silo associated with a first subsystem of a system;
receiving second risk identification information from a second risk silo associated with a first subsystem of the system;
storing the first risk identification information and the second risk identification information in a risk aggregation data store;
receiving a change request indicating a potential change to the system, wherein the change request comprises a specialized computer parsable file comprising a tag structure, wherein the computer parsable file comprises tags that define conditions and corresponding computations associated with the system in response to the potential change;

identifying key words, phrases, or both from the change request by performing machine learning based upon the tags using a machine learning algorithm comprising a mathematical model configured to learn an objective function, wherein the mathematical model comprises input data and output data, wherein the objective function is configured to enable the machine learning algorithm to determine the output data for the input data that is not a part of training data used to train the mathematical model;

identify machine learning patterns indicating the potential change by performing the machine learning based upon the key words, phrases, or both;

identifying a risk associated with the change request, by performing the machine learning based upon the machine learning patterns, using the first risk identification information and the second risk identification information as the training data;

presenting the risk via an electronic risk report;

adding the risk to the risk aggregation data store configured to update the training data based on the risk;

iteratively optimizing the objective function based on the updated training data;

retraining the mathematical model to learn the iteratively optimized objective function based on the updated training data;

enabling the first risk silo and the second risk silo to cross-identify and report one or more new risks across the first subsystem and the second subsystem with improved accuracy based on the first risk identification information and the second risk identification information using the machine learning comprising the iteratively optimized objective function and retrained mathematical model;

receiving an electronic document from the system;

generating recommendations based on a risk compliance analysis using the machine learning based on the key words, phrases, or both, and the electronic document; and generating a graphical markup of the electronic document based on the recommendations, wherein the electronic markup comprises an interactive graphic user interface configured to allow a user to modify the electronic document based on the recommendations.

14. The computer-implemented method of claim 13, comprising: retrieving an electronic indication of real results associated with an implementation of the change request; and applying the real results to the training data to impact subsequent machine learning.

15. The computer-implemented method of claim 13, comprising: receiving change requests of varying granularity, wherein relatively granular change requests result in more precise risk results with a narrower risk net.

16. The computer-implemented method of claim 13, wherein the change request comprises an electronic request for information (RFI), an electronic request for proposal (RFP), or both.

17. The computer-implemented method of claim 13, wherein the change request comprises an electronic regulation (REG), comprising an indication of conditions and corresponding actions; the computer-implemented method comprising: parsing the electronic regulation to identify regulation key words, phrases, or both; and performing the machine learning based upon a comparison of the key words, phrases, or both from the change request and the regulation key words, phrases, or both.

18. The computer-implemented method of claim 13, wherein the change request comprises an electronic regulation (REG), comprising an indication of conditions and corresponding actions; the computer-implemented method comprising: parsing the electronic regulation to identify regulation key words, phrases, or both; and identifying conditions associated with the regulation key words, phrases, or both; storing the conditions associated with the regulation key words, phrases, or both in a data store for subsequent regulation compliance analysis; and performing the subsequent regulation compliance analysis, by: receiving an electronic contract draft; parsing the electronic contract draft to identify draft key words, phrases, or both; comparing the stored conditions with the regulation key words, phrases, or both to the draft key words, phrases, or both to identify whether the conditions are met; provide a graphical markup of the electronic contract draft based at least in part upon whether the conditions are met; render a markup indicating that a portion of the electronic contract draft is believed to not apply to a current situation applicable to the electronic contract draft; or render a markup providing a new portion to the electronic contract draft and indicating that the new portion of the electronic contract draft is believed to apply to a current situation applicable to the electronic contract draft; or both.

19. The computer-implemented method of claim 13, comprising: presenting the electronic risk report to a results blockchain, wherein the electronic risk report comprises a block submitted for placement on the results blockchain.

20. A computer, configured to:

receive first risk identification information from a first risk silo associated with a first subsystem of a system;

receive second risk identification information from a second risk silo associated with a first subsystem of the system;

store the first risk identification information and the second risk identification information in a risk aggregation data store;

receive a change request indicating a potential change to the system, wherein the change request comprises a specialized computer parsable file comprising a tag structure, wherein the computer parsable file comprises tags that define conditions and corresponding computations associated with the system in response to the potential change;

identify key words, phrases, or both from the change request by performing machine learning based upon the tags using a machine learning algorithm comprising a mathematical model configured to learn an objective function, wherein the mathematical model comprises input data and output data, wherein the objective function is configured to enable the machine learning algorithm to determine the output data for the input data that is not a part of training data used to train the mathematical model;

identify machine learning patterns indicating the potential change by performing the machine learning based upon the key words, phrases, or both;

identify a risk associated with the change request, by performing the machine learning based upon the machine learning patterns, using the first risk identification information and the second risk identification information as training data;

present the risk via an electronic risk report;

add the risk to the risk aggregation data store configured to update the training data based on the risk;

iteratively optimize the objective function based on the updated training data;

retrain the mathematical model to learn the iteratively optimized objective function based on the updated training data;

enable the first risk silo and the second risk silo to cross-identify and report one or more new risks across the first subsystem and the second subsystem with improved accuracy based on the first risk identification information and the second risk identification information using the machine learning comprising the iteratively optimized objective function and retrained mathematical model;

receive an electronic document from the system;

generate recommendations based on a risk compliance analysis using the machine learning based on the key words, phrases, or both, and the electronic document; and generate a graphical markup of the electronic document based on the recommendations, wherein the electronic markup comprises an interactive graphic user interface configured to allow a user to modify the electronic document based on the recommendations.

* * * * *